(12) United States Patent
Deschamps

(10) Patent No.: US 8,546,022 B2
(45) Date of Patent: Oct. 1, 2013

(54) BILAYER ELECTROLYTE FOR A LITHIUM BATTERY

(71) Applicant: Marc Deschamps, Quimper (FR)

(72) Inventor: Marc Deschamps, Quimper (FR)

(73) Assignee: Batscap, Ergue-Gaberic (FR)

( * ) Notice: Subject to any disclaimer, the term of this patent is extended or adjusted under 35 U.S.C. 154(b) by 0 days.

(21) Appl. No.: 13/853,209

(22) Filed: Mar. 29, 2013

(65) Prior Publication Data

US 2013/0216916 A1    Aug. 22, 2013

Related U.S. Application Data

(62) Division of application No. 11/795,682, filed as application No. PCT/FR2006/000125 on Jan. 19, 2006, now Pat. No. 8,431,266.

(30) Foreign Application Priority Data

Jan. 24, 2005 (FR) ..................... 05 00715

(51) Int. Cl.
  *H01M 10/0562*  (2010.01)
  *C08J 5/20*     (2006.01)
  *B29C 47/06*    (2006.01)
  *B32B 37/06*    (2006.01)

(52) U.S. Cl.
  USPC ........... 429/309; 429/304; 429/317; 429/322; 521/27; 264/514

(58) Field of Classification Search
  USPC ........... 429/142, 144, 309; 252/62.2; 521/27
  See application file for complete search history.

(56) References Cited

U.S. PATENT DOCUMENTS

| 5,716,421 A | 2/1998 | Pendalwar et al. |
| 5,925,483 A | 7/1999 | Kejha et al. |
| 6,645,675 B1 | 11/2003 | Munshi |
| 6,699,623 B1 | 3/2004 | Dai |
| 7,014,948 B2 | 3/2006 | Lee et al. |
| 2002/0187401 A1 | 12/2002 | Lee et al. |
| 2003/0148188 A1 | 8/2003 | Umemoto |

FOREIGN PATENT DOCUMENTS

| FR | 2841045 | 12/2003 |
| WO | 9837589 A1 | 8/1998 |
| WO | 02061872 A1 | 8/2002 |

OTHER PUBLICATIONS

Xi et al., "PVDF-PEO blends based microporous polymer electrolyte: Effect of PEO on pore configurations and ionic conductivity," 2006, Journal of Power Sources, 157, 501-506.
Database WPI, Section El, Week 200339, Derwent Publications Ltd., London, GB, AN 2002-357486, XP002345637.

*Primary Examiner* — Barbara Gilliam
*Assistant Examiner* — Robert S Carrico
(74) *Attorney, Agent, or Firm* — Merchant & Gould

(57) ABSTRACT

The invention relates to a bilayer polymer electrolyte for a lithium battery. The electrolyte comprises the layers N and P, each composed of a solid solution of an Li salt in a polymer material, the Li salt being the same in both layers, the polymer material content being at least 60% by weight, and the lithium salt content being from 5 to 25% by weight. The polymer material of the layer P contains a solvating polymer and a nonsolvating polymer, the weight ratio of the two polymers being such that the solvating polymer forms a continuous network. The polymer material of the layer N is composed of a solvating polymer and optionally a nonsolvating polymer, the weight ratio of the two polymers being such that the solvating polymer forms a continuous network, and the nonsolvating polymer does not form a continuous network.

16 Claims, No Drawings

BILAYER ELECTROLYTE FOR A LITHIUM BATTERY

The present application is a divisional of U.S. patent application Ser. No. 11/795,682, filed 11 Jun. 2008, which is a 371 application of PCT/FR2006/000125, filed 19 Jan. 2006, which claims priority to French Application No. 05/00715, filed 24 Jan. 2005, the contents of all of which are hereby incorporated by reference in their entirety.

BACKGROUND OF THE INVENTION

Lithium batteries operate by exchange of lithium ions between an anode and a cathode, through an electrolyte that comprises a lithium salt in solution in a liquid solvent or in a polymer solvent. In one particular embodiment, the electrolyte is a solid solution of a salt in a solvent, and the various components of the battery are in the form of films. The film forming the positive electrode is applied to a current collector, the film forming the electrolyte is between the two films that respectively form the positive electrode and the negative electrode. A polymer may be used as a solvent for the salt if it is capable of solvating the salt cations. Polymers mainly composed of ethylene oxide units (PEO) have been widely used as solvents for the salt.

However, the mechanical strength conferred by a PEO on the electrolyte film is weak, especially in the temperature range in which the battery operates. Moreover, during successive operating cycles of the battery, the lithium has a tendency to form dendrites, which greatly reduces the lifetime of the battery. EP-1 139 128 describes a battery whose configuration aims to suppress the problem created by the formation of dendrites. Said battery comprises, as an electrolyte, an ion-conductive polymer film placed between the anode and the cathode. The ion-conductive polymer film is composed of a matrix of said polymer that holds a nonaqueous solution containing a lithium salt, said matrix being formed by two layers formed one on the anode and the other on the cathode. The lithium salt concentration is higher in the polymer matrix on the cathode side than on the anode side. For example, the conductive polymer layer on the anode side is composed of a mixture of trifunctional PEO bearing three terminal acrylate groups and a solution of $LiPF_6$ in an EC/EMC mixture dissolved in DPMA and cast on the anode then crosslinked by irradiation, and the conductive polymer layer on the cathode side is composed of a mixture of the same trifunctional PEO and of a solution of $LiPF_6$ in an EC/γ-butyrolactone mixture dissolved in DPMA and cast on the cathode, then crosslinked by irradiation. However, the presence of nonaqueous liquid in the conductive polymer tends to form foams, which deactivates some of the lithium, and therefore makes it necessary to use an excess of lithium.

U.S. Pat. No. 5,925,483 describes an electrolyte in the form of a film composed of two layers, and its use in a battery of which one electrode is an alkali metal. The first layer is of the ion-conductive polymer type, and it is in contact with the anode. The second layer (also of the ion-conductive polymer type) is in contact with the first layer and with the cathode, said second layer containing at least one aprotic liquid and at least one alkali metal salt, which diffuse into the first layer to activate it. In all the examples, the second layer effectively contains an aprotic liquid. However, the presence of the aprotic liquid that diffuses into the first layer causes said liquid to be brought into contact with the alkali metal anode, which has the result of causing the formation of an alkali metal foam, to the detriment of the lifetime of the battery which contains the bilayer as an electrolyte.

SUMMARY OF THE INVENTION

The object of the present invention is to provide a lithium battery in which the formation of dendrites during successive cycles is reduced, or even eliminated, while decreasing the excess of lithium required.

Consequently, one subject of the present invention is a composite film intended to form the electrolyte of a lithium battery, and also a lithium battery comprising such an electrolyte.

DETAILED DESCRIPTION OF THE PREFERRED EMBODIMENTS

The composite film according to the present invention comprises a layer known as layer N and a layer known as layer P, and it is characterized in that:
- each of the layers P and N is composed of a solid solution of a lithium salt in a polymer material, the lithium salt being the same in both layers, the polymer material content being at least 60% by weight, and the lithium salt content being from 5 to 25% by weight;
- the polymer material of the layer P contains a solvating polymer and a nonsolvating polymer, the weight ratio of the two polymers being such that the solvating polymer forms a continuous network; and
- the polymer material of the layer N is composed of a solvating polymer and optionally a nonsolvating polymer, the weight ratio of the two polymers being such that the solvating polymer forms a continuous network, and the nonsolvating polymer does not form a continuous network.

The fact that the solvating polymer forms a continuous network within each of the layers P and N means that, in each of the layers, said solvating polymer forms a matrix within which the other constituents of the layer are dissolved or dispersed. In such a structure, the migration of lithium ions through the composite film is carried out via the solvating polymer.

In one preferred embodiment, the layer P is such that the solvating polymer and the nonsolvating polymer form a co-continuous network. In such a case, the two polymers together form the matrix of the material forming the layer P.

It is advantageous that the solvating polymer of the layer P be the same as that of the layer N. Similarly, when the layer N comprises a nonsolvating polymer, it is advantageous that said nonsolvating polymer be identical to the nonsolvating polymer of the layer P.

The solvating polymer may be chosen from the homopolymers and copolymers of ethylene oxide, methylene oxide, propylene oxide, epichlorohydrin or allyl glycidyl ether.

The nonsolvating polymer may be chosen from halogenated polymers. By way of example, mention may be made of the homopolymers and copolymers of vinyl chloride, vinylidene fluoride, vinylidene chloride, ethylene tetrafluoride, and chlorotrifluoroethylene, and vinylidene fluoride/hexafluoropropylene copolymers, and blends thereof.

When the material forming a given layer comprises a solvating polymer and a nonsolvating polymer, the formation of a continuous or co-continuous network especially depends on the nature of the polymers chosen and on their respective proportions. For example, when the polymer material of one layer comprises a polyethylene oxide PEO as a solvating polymer and a polyvinylidene fluoride PVDF as a nonsolvating polymer, a continuous PEO network is obtained when the polymer material contains at least 35% by weight of PEO. With the same polymers, a co-continuous network is obtained when the polymer material contains at least 35% by weight of PEO and at least 35% by weight of PVDF.

Determination of the proportions that are to be respected in order to obtain either a continuous network of solvating polymer, or a co-continuous network of solvating polymer and of nonsolvating polymer, is within the scope of a person skilled in the art. For a given solvating polymer P1-nonsolvating polymer P2 pair, a series of P1-P2 blends is prepared, of which the composition by weight varies, for example, in steps of 10%. For each composition, two samples are prepared. One of the samples of each composition is placed in a liquid that is a solvent for the solvating polymer P1 and that is not a solvent for the nonsolvating polymer P2, and the other sample of each composition is placed in a liquid that is a solvent for the polymer P2 and that is not a solvent for the polymer P1. For each test of selective dissolution carried out for a given polymer (P1 or P2), the proportion of polymer dissolved in the solvent is determined relative to the amount of the polymer initially present in the sample. This proportion represents the degree of continuity of the given polymer in the polymer material. When, for a given sample, the amount of a polymer found in the solution is equal to the amount of polymer initially contained in the sample, the degree of continuity of the polymer is considered to be 100%.

The lithium salt may be chosen from $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$, and $LiN(SO_2CF_3)_2$. $LiN(SO_2CF_3)_2$, denoted hereinafter by LiTFSI, is particularly preferred.

Obviously, the solid solution that forms each of the layers of the electrolyte may contain additives conventionally used in solid polymer electrolytes, such as fillers intended to improve the mechanical strength. By way of example, mention may be made of MgO, $TiO_2$, $SiO_2$, $BaTiO_3$ or $Al_2O_3$.

In one particular embodiment of the invention, the solvating polymer is a polyethylene oxide (PEO), the nonsolvating polymer is a vinylidene fluoride homopolymer (PVDF) or a vinylidene fluoride/hexafluoropropylene copolymer (PVDF/HFP), the layers N and P forming the electrolyte have the following composition:

|  | % by weight |
|---|---|
| Layer N | |
| Solvating polymer: PEO | 60-85 |
| Nonsolvating polymer (PVDF or PVDF/HFP) | 0-12 |
| Lithium salt | 15-25 |
| Additive | 0-15 |
| Layer P | |
| Solvating polymer: PEO | 35-60 |
| Nonsolvating polymer (PVDF or PVDF/HFP) | 25-60 |
| Lithium salt | 5-20 |
| Additive | 0-10 |

The layers N and P are advantageously manufactured by extruding a composition comprising the appropriate constituents in the appropriate proportions. The layer N may be extruded using a single-screw extruder or a twin-screw extruder. The layer P is preferably produced using a twin-screw extruder, which allows a better dispersion of the various constituents. The bilayer film forming the electrolyte is obtained by hot rolling the layers N and P.

The battery that forms another subject of the present invention is composed of a composite film according to the invention, placed between a film that makes up the negative electrode and a film that makes up the positive electrode so that the layer N of the composite film is adjacent the negative electrode and the layer P of the composite film is adjacent the positive electrode, said positive electrode being in contact with a current collector. In such a battery, the layer N has the effect of ensuring a good contact between the electrolyte and the negative electrode, and the layer P has the effect of preventing the growth of dendrites and of improving the mechanical strength of the electrolyte.

In the lithium batteries according to the present invention, the thickness of the films that make up the various components of the battery is in general around 1 to 100 micrometers. Preferably, for the composite film forming the electrolyte of the battery, the layer N has a thickness of 1 to 30 µm and the layer P has a thickness of 5 to 20 µm.

In a battery according to the invention, the negative electrode may be composed of metallic lithium or of one of its alloys.

The active material of the positive electrode may be chosen from vanadium oxides $VO_X$ ($2 \leq x \leq 2.5$), $LiV_3O_8$, $Li_yNi_{1-x}Co_xO_2$, ($0 \leq x \leq 1$; $0 \leq y \leq 1$), manganese spinels $Li_yMn_{1-x}M_xO_2$, (M=Cr, Al, V, Ni $0 \leq x \leq 0.5$; $0 \leq y \leq 2$), organic polydisulfides, FeS, $FeS_2$, iron sulfate $Fe_2(SO_4)_3$, iron and lithium phosphates and phosphosilicates of olivine structure, or their products from substituting iron with manganese, used alone or as mixtures. The positive electrode collector is preferably made from aluminum, optionally coated with a carbon-based layer.

EXAMPLES

The present invention is illustrated by the following examples, to which it is not however limited.

Example 1

A composite film was prepared having the following composition:

|  | % by weight |
|---|---|
| Layer N (thickness 20 µm) | |
| PEO | 70 |
| PVDF/HFP: 85/15 | 2.2 |
| LiTFSI | 17.8 |
| MgO | 10 |
| Layer P (thickness 10 µm) | |
| PEO | 36 |
| PVDF/HFP: 85/15 | 50 |
| LiTFSI | 9 |
| MgO | 5 |

The layer N was prepared by extruding a mixture of the appropriate amounts of PEO, PVDF/HFP, LiTFSI and MgO in a single-screw extruder equipped with a sheet die. The layer P was prepared by extruding a mixture of the appropriate amounts of PEO, PVDF/HFP, LiTFSI and MgO in a twin-screw extruder equipped with a sheet die. Next, the two layers obtained were assembled by hot rolling, to form a bilayer component having a thickness of 30 µm.

Example 2

The procedure from Example 1 was repeated by introducing, into a single-screw extruder, the following composition intended to form the layer N:

| Layer N | % by weight |
|---|---|
| PEO | 78 |
| PVDF/HFP: 85/15 | 2.5 |
| LiTFSI | 19.5 | and by introducing, into a twin-screw extruder, the following composition intended to form the layer P:

| Layer P | % by weight |
|---|---|
| PEO | 40 |
| PVDF/HFP: 85/15 | 50 |
| LiTFSI | 10 |

Next, the two layers were assembled by hot rolling, to obtain a material of which the layer N had a thickness of 20 μm and the layer P had a thickness of 10 μm to form a bilayer component having a thickness of 30 μm.

Example 3

The procedure from Example 1 was repeated by introducing, into a single-screw extruder, the following composition intended to form the layer N:

| Layer N | % by weight |
|---|---|
| PEO/PO/AGE | 80 |
| LiTFSI | 20 | and by introducing, into a twin-screw extruder, the following composition intended to form the layer P:

| Layer P | % by weight |
|---|---|
| PEO/PO/AGE | 40 |
| PVDF/HFP | 50 |
| LiTFSI | 10 |

Next, the two layers were assembled by hot rolling, to obtain a material of which the layer N had a thickness of 20 μm and the layer P had a thickness of 10 μm to form a bilayer component having a thickness of 30 μm.

Example 4

A battery (N+P battery) containing the bilayer film from Example 1 as an electrolyte was prepared. The anode was a lithium film having a thickness of 100 μm. The cathode was a 50 μm film of a composite placed on a current collector made of aluminum coated with a carbon-based layer, said composite comprising $LiV_3O_8$ as the active material of the electrode, carbon black as the material generating electron conductivity and a PEO containing TFSI as a binder.

The bilayer film from Example 1 was co-laminated with the lithium film and the film forming the electrode.

By way of comparison, two other batteries were prepared in the same manner by simply changing the electrolyte. One of the batteries (battery N) comprised the layer N as an electrolyte, the other battery (battery P) comprised the layer P as an electrolyte.

The battery according to the invention and also the comparative batteries were made to operate with a C/2 discharge rate and a C/4 charge rate, by setting a voltage between 3.3 and 2 V at the terminals, and the lifetime of the batteries was determined The term "lifetime" is understood to mean the number of cycles required for a battery to lose 20% of its initial capacity.

The lifetime observed in the three cases is given below:

| Battery | Lifetime |
|---|---|
| N + P | 700 cycles |
| N | 400 cycles |
| P | 50 cycles |

Thus it appears that the use of the bilayer film as an electrolyte substantially increases the lifetime of the battery, especially relative to a conventional battery having a solid solution of lithium salt in PEO as an electrolyte.

Comparative Example

Cycling tests for batteries having a lithium anode were carried out by using a bilayer having a composition according to U.S. Pat. No. 5,925,483 as an electrolyte.

Test No. 1

The first layer was deposited on a lithium anode from a composition containing 80% PEO and 20% $(CF_3SO_2)NLi$ (LiTFSI). The second layer was deposited on the cathode from a composition containing 50% of a propylene carbonate (PC)/ethylene carbonate (EC) mixture (ratio: 1/1), containing LiTFSI (concentration: 1M), 25% PVDF, and 25% PEO.

The battery was assembled with the following succession of layers: anode/$1^{st}$ layer/$2^{nd}$ layer/cathode, the assembly of the first and second layers forming the electrolyte. The anode was a lithium film having a thickness of 100 μm. The cathode was a 50 μm film of a composite placed on a current collector made of aluminum and coated with a carbon-based layer. The composite comprised $LiV_3O_8$ as the active material of the electrode, carbon black as the material generating electron conductivity, PVDF used as a binder and a mixture of EC/PC (1/1) and LiTFSI (1M) providing the ion conductivity. The assembly of the battery was carried out by co-laminating the bilayer film with the lithium film forming the anode and the composite film forming the cathode.

The battery thus formed was made to operate with a C/2 discharge rate and a C/4 charge rate, by setting a voltage between 3.3 and 2 V at the terminals, and the lifetime of the battery was determined. The term "lifetime" is understood to mean the number of cycles required for a battery to lose 20% of its initial capacity.

The lifetime observed in this case was 60 cycles. Dismantling the battery revealed the presence of a lithium foam.

Test No. 2

The procedure from Test No. 1 was repeated, but replacing the first layer from Test No. 1 with a layer prepared from a mixture of LiTFSI, PEO, EC and PC (10/40/25/25). A battery was assembled in the same way as in Example 1 and it was made to operate under the conditions of Example 1.

The lifetime observed in this test was 70 cycles, and dismantling the battery also revealed the presence of a lithium foam.

If the lifetime of these two batteries according to the prior art (respectively 60 and 70 cycles) is compared with the lifetime of the battery produced with the bilayer electrolyte described in Example 4 of the present application (700 cycles), it clearly appears that the difference in composition between the layers of the present application and those of the prior art (that is to say, the absence of aprotic liquid in the present application) results in a surprising effect, namely a substantial improvement in the lifetime, which is increased by a factor of 10.

The invention claimed is:

1. A battery comprising an electrolyte film placed between a positive electrode and a negative electrode formed from a lithium or lithium alloy film, wherein:
   the electrolyte film is a composite film comprising a layer known as layer N and a layer known as layer P, wherein:
   each of the layers P and N is composed of a solid solution of a lithium salt in a polymer material, the lithium salt being the same in both layers, the polymer material content being at least 60% by weight, and the lithium salt content being from 5 to 25% by weight;
   the polymer material of the layer P comprises from 35 to 60% by weight of a solvating polymer and from 25 to 60% by weight of a nonsolvating polymer, from 5 to 20% by weight of lithium salt, and from 0 to 10% by weight of an additive, the weight ratio of the two polymers being such that the solvating polymer forms a continuous network;
   the polymer material of the layer N comprises from 60 to 85% by weight of a solvating polymer and from 0 to 12% by weight of a nonsolvating polymer, from 15 to 25% by weight of lithium salt, and from 0 to 15% by weight of an additive, the weight ratio of the two polymers being such that the solvating polymer forms a continuous network, and the nonsolvating polymer does not form a continuous network; and
   each of the layers P and N is free from any aprotic liquid; and
   the layer N of the composite film is adjacent to the negative electrode and the layer P of the composite film is adjacent to the positive electrode, said positive electrode being in contact with a current collector.

2. The battery as claimed in claim 1, wherein the solvating polymer present in layer P and in layer N is independently selected from the group consisting of homopolymers and copolymers of ethylene oxide, methylene oxide, propylene oxide, epichlorohydrin and allyl glycidyl ether.

3. The battery as claimed in claim 1, wherein the nonsolvating polymer present in layer P and in layer N is independently selected from the group consisting of homopolymers and copolymers of vinyl chloride, vinylidene fluoride, vinylidene chloride, ethylene tetrafluoride, chlorotrifluoroethylene, vinylidene fluoride/hexafluoropropylene copolymers, and blends thereof.

4. The battery as claimed in claim 1, wherein the lithium salt is selected from the group consisting of $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$, and $LiN(SO_2CF_3)_2$.

5. The battery as claimed in claim 1, wherein the solid solution that forms one or both of the layers N and P contains an additive.

6. The battery as claimed in claim 5, wherein the additive is selected from the group consisting of $MgO$, $TiO_2$, $SiO_2$, $BaTiO_3$ and $Al_2O_3$.

7. The battery as claimed in claim 1, wherein the layer N contains from 60 to 85% by weight of solvating polymer chosen from polyethylene oxide, from 0 to 12% by weight of nonsolvating polymer chosen from polyvinylidene fluoride and vinylidene fluoride/hexafluoropropylene copolymers, from 15 to 25% by weight of lithium salt, and from 0 to 15% by weight of an additive.

8. The battery as claimed in claim 1, wherein the layer P contains from 35 to 60% by weight of solvating polymer chosen from polyethylene oxide, from 25 to 60% by weight of nonsolvating polymer chosen from polyvinylidene fluoride and vinylidene fluoride/hexafluoropropylene copolymers, from 5 to 20% by weight of lithium salt, and from 0 to 10% by weight of an additive.

9. The battery as claimed in claim 1, wherein the layer N has a thickness of 1 to 30 μm and the layer P has a thickness of 5 to 20 μm.

10. The battery as claimed in claim 1, wherein the respective proportions of solvating polymer and of nonsolvating polymer in the layer P are chosen so that the two polymers form a co-continuous network.

11. The battery as claimed in claim 1, wherein the solvating polymer of the layer P is identical to that of the layer N.

12. The battery as claimed in claim 1, wherein the nonsolvating polymer of the layer P is identical to that of the layer N.

13. A process for preparing a composite film comprising a layer known as layer N and a layer known as layer P, wherein:
   each of the layers P and N is composed of a solid solution of a lithium salt in a polymer material, the lithium salt being the same in both layers, the polymer material content being at least 60% by weight, and the lithium salt content being from 5 to 25% by weight;
   the polymer material of the layer P comprises from 35 to 60% by weight of a solvating polymer and from 25 to 60% by weight of a nonsolvating polymer, from 5 to 20% by weight of lithium salt, and from 0 to 10% by weight of an additive, the weight ratio of the two polymers being such that the solvating polymer forms a continuous network;
   the polymer material of the layer N comprises from 60 to 85% by weight of a solvating polymer and from 0 to 12% by weight of a nonsolvating polymer, from 15 to 25% by weight of lithium salt, and from 0 to 15% by weight of an additive, the weight ratio of the two polymers being such that the solvating polymer forms a continuous network, and the nonsolvating polymer does not form a continuous network; and
   each of the layers P and N is free from any aprotic liquid
   wherein the process comprises:
   preparing a composition containing the constituents of the layer P and a composition containing the constituents of the layer N;
   extruding each of the compositions to form the two layers; and
   assembling the two layers by hot rolling, wherein each of the layers P and N is free from any aprotic liquid.

14. The process as claimed in claim 13, wherein the composition forming the layer P is extruded using a twin-screw extruder, and the composition forming the layer N is extruded using a single-screw or twin-screw extruder.

15. The process as claimed in claim 13, wherein the layer P is extruded using a twin-screw extruder and the composition forming the layer N is extruded using a single-screw extruder.

16. The process as claimed in claim 13, wherein the layer P is extruded using a twin-screw extruder and the composition forming the layer N is extruded using a twin-screw extruder.

* * * * *